United States Patent
Podanoffsky

(10) Patent No.: US 6,725,218 B1
(45) Date of Patent: Apr. 20, 2004

(54) COMPUTERIZED DATABASE SYSTEM AND METHOD

(75) Inventor: Michael Podanoffsky, Hudson, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/561,151

(22) Filed: Apr. 28, 2000

(51) Int. Cl.$^7$ ............................................... G06F 17/30
(52) U.S. Cl. ............................ 707/10; 707/3; 707/102; 707/104.1
(58) Field of Search ............................... 707/1–10, 100, 707/101, 102, 103, 104.1, 203; 713/200

(56) References Cited

U.S. PATENT DOCUMENTS

| | | | |
|---|---|---|---|
| 3,866,175 A | 2/1975 | Seifert, Jr. et al. | 340/825.52 |
| 4,031,512 A | 6/1977 | Faber | 340/147 |
| 4,264,808 A | 4/1981 | Owens et al. | 235/379 |
| 4,298,978 A | 11/1981 | Nakamura | 370/92 |
| 4,335,426 A | 6/1982 | Maxwell et al. | 364/200 |
| 4,374,409 A | 2/1983 | Bienvenu et al. | 364/200 |
| 4,385,285 A | 5/1983 | Horst et al. | 382/3 |
| 4,435,753 A | 3/1984 | Rizzi | 364/200 |
| 4,466,001 A | 8/1984 | Moore et al. | 340/825.47 |
| 4,510,615 A | 4/1985 | Rohrer | 382/7 |
| 4,523,330 A | 6/1985 | Cain | 382/7 |
| 4,558,413 A | 12/1985 | Schmidt et al. | 364/300 |
| 4,580,040 A | 4/1986 | Granzow et al. | 235/379 |
| 4,608,562 A | 8/1986 | Minor et al. | 340/825.59 |
| 4,617,457 A | 10/1986 | Granzow et al. | 235/379 |
| 4,633,490 A | 12/1986 | Goertzel et al. | 375/122 |
| 4,667,290 A | 5/1987 | Goss et al. | 364/300 |
| 4,670,848 A | 6/1987 | Schramm | 364/513 |
| 4,685,141 A | 8/1987 | Hogue et al. | 382/7 |
| 4,729,096 A | 3/1988 | Larson | 364/300 |
| 4,736,441 A | 4/1988 | Hirose et al. | 382/48 |

(List continued on next page.)

OTHER PUBLICATIONS

Horstmann et al., DCOM Architecture, Jul. 23, 1997, pp. 1–54.
Williams et al., The Component Object Model: A Technical Overview, Oct., 1994, pp. 1–21.
Eric Fleischman, Advanced Streaming Format (ASF) Specification, Feb. 26, 1998, pp. 1–58.

*Primary Examiner*—Kim Vu
*Assistant Examiner*—Anh Ly
(74) *Attorney, Agent, or Firm*—Cesari and McKenna, LLP

(57) ABSTRACT

A computerized database system and method are disclosed. In one aspect of the invention, database records are associated with respective unique identification keys. Each key specifies values that specify both a logical location and a physical server assigned to that location where the respective record associated with that key is located.

49 Claims, 5 Drawing Sheets

U.S. PATENT DOCUMENTS

| | | | |
|---|---|---|---|
| 4,782,444 A | 11/1988 | Munshi et al. | 364/300 |
| 4,783,752 A | 11/1988 | Kaplan et al. | 364/513 |
| 4,813,077 A | 3/1989 | Woods et al. | 382/7 |
| 4,850,025 A | 7/1989 | Abe | 382/9 |
| 4,860,203 A | 8/1989 | Corrigan et al. | 364/300 |
| 4,873,514 A | 10/1989 | Nakagawa et al. | 340/726 |
| 4,887,204 A | 12/1989 | Johnson et al. | 364/200 |
| 4,888,726 A | 12/1989 | Struger et al. | 364/900 |
| 4,897,781 A | 1/1990 | Chang et al. | 364/200 |
| 4,903,311 A | 2/1990 | Nakamura | 382/9 |
| 4,931,928 A | 6/1990 | Greenfield | 364/300 |
| 4,947,315 A | 8/1990 | Sokolow et al. | 364/200 |
| 5,546,452 A | 8/1996 | Andrews et al. | 379/219 |
| 5,577,240 A * | 11/1996 | Demers et al. | 707/8 |
| 5,742,820 A | 4/1998 | Perlman et al. | 395/617 |
| 5,752,245 A * | 5/1998 | Parrish et al. | 707/10 |
| 5,761,499 A | 6/1998 | Sonderegger | 395/610 |
| 5,794,232 A | 8/1998 | Mahlum et al. | 707/3 |
| 5,832,487 A | 11/1998 | Olds et al. | 707/10 |
| 5,870,739 A | 2/1999 | Davis, III et al. | 707/4 |
| 5,878,130 A | 3/1999 | Andrews et al. | 379/265 |
| 5,878,415 A | 3/1999 | Olds | 707/9 |
| 5,884,322 A * | 3/1999 | Sidhu et al. | 707/10 |
| 5,924,094 A * | 7/1999 | Sutter | 707/10 |
| 5,940,289 A * | 8/1999 | Iwata et al. | 700/2 |
| 5,968,121 A * | 10/1999 | Logan et al. | 709/219 |
| 6,044,367 A * | 3/2000 | Wolff | 707/2 |
| 6,052,717 A * | 4/2000 | Reynolds et al. | 709/218 |
| 6,125,457 A * | 9/2000 | Crisan et al. | 709/225 |
| 6,167,403 A * | 12/2000 | Whitmire et al. | 707/10 |
| 6,202,169 B1 * | 3/2001 | Razzaghe-Ashrafi et al. | 714/6 |
| 6,209,000 B1 * | 3/2001 | Klein et al. | 707/203 |
| 6,272,523 B1 * | 8/2001 | Factor | 707/10 |
| 6,389,460 B1 * | 5/2002 | Stewart et al. | 709/217 |
| 6,401,128 B1 * | 6/2002 | Stai et al. | 709/236 |
| 6,405,219 B2 * | 6/2002 | Saether et al. | 707/201 |
| 6,411,966 B1 * | 6/2002 | Kwan et al. | 707/10 |
| 6,490,610 B1 * | 12/2002 | Rizvi et al. | 707/10 |
| 6,526,418 B1 * | 2/2003 | Midgley et al. | 707/203 |
| 6,535,869 B1 * | 3/2003 | Housel, III | 707/2 |
| 6,598,090 B2 * | 7/2003 | Champlin | 707/10 |

* cited by examiner

COMPUTERIZED DATABASE SYSTEM AND METHOD

BACKGROUND OF THE INVENTION

1. Field of the Invention

The present invention relates generally to a computerized database system and method, and more specifically, to a distributed computerized database system and method. As used herein, a database "data record" comprises objects and other data items in a distributed computer database that may be accessed and/or modified by a database management or client process. Also as used herein, the "modification" of such a data record may comprise the creation of the data record.

2. Brief Description of Related Prior Art

Data communication in a computer network involves data exchange between two or more entities interconnected by communication links. These entities are typically software program processes executing on computer nodes, such as endstations and intermediate stations. Examples of an intermediate station may be a router or switch which interconnects the communication links and subnetworks to enable transmission of data between the endstations. A local area network (LAN) is an example of a subnetwork that provides relatively short distance communication among the interconnected stations, whereas a wide area network enables long distance communication over links provided by public or private telecommunications facilities.

Communication software executing on the endstations correlate and manage data communication with other endstations. The stations typically communicate by exchanging discrete packets or frames of data according to predefined protocols. In this context, a protocol consists of a set of rules defining how the stations interact with each other. In addition, network routing software executing on the routers allow expansion of communication to other endstations. Collectively, these hardware and software components comprise a communications network and their interconnections are defined by an underlying architecture.

Modern communications network architectures are typically organized as a series of hardware and software levels or "layers" within each station. These layers interact to format data for transfer between, e.g., a source station and a destination station communicating over the network. Predetermined services are performed on the data as it passes through each layer and the layers communicate with each other by means of the predefined protocols. The lower layers of these architectures are generally standardized and are typically implemented in the form of software running on the stations attached to the network. In one example of such a communications architecture there are five layers which are termed, in ascending interfacing order, physical interface, data link, network, transport and application layers. These layers are arranged to form a protocol stack in each communicating station of the network. FIG. 1 illustrates a schematic block diagram of prior art protocol stacks 125 and 175 used to transmit data between a source station 110 and a destination station 150, respectively, of a network 100. As can be seen, the stacks 125 and 175 are physically connected through a communications medium 180 at the interface layers 120 and 160. For ease of description, the protocol stack 125 will be described.

In general, the lower layers of the communications stack provide inter networking services and the upper layers, which are the users of these services, collectively provide common network application services. The application layer 112 provides services suitable for the different types of applications using the network, while the lower interface layer 120 accepts industry standards defining a flexible network architecture oriented to the implementation of LANs.

Specifically, the interface layer 120 comprises the physical interface layer 126, which is concerned with the actual transmission of signals across the physical communications medium and defines the types of cabling, plugs and connectors used in connection with the channel or medium. The data link layer (i.e., "layer 2") 121 is responsible for transmission of data from one station to another and may be further divided into two sublayers: Logical Link Control (LLC 122) and Medium Access Control (MAC 124).

The MAC sublayer 124 is primarily concerned with controlling access to the transmission medium in an orderly manner and, to that end, defines procedures by which the stations must abide in order to share the medium. In order for multiple stations to share the same medium and still uniquely identify each other, the MAC sublayer defines a hardware or data link address called a MAC address. This MAC address is unique for each station interfacing to a LAN. The LLC sublayer 122 manages communications between devices over a single link of the network.

The network layer 116 (i.e., "layer 3") provides network routing and that relies on transport protocols for end-to-end reliability. An example of a network layer protocol is the Internet Protocol ("IP"). An example of such a transport protocol is the Transmission Control Protocol (TCP) contained within the transport layer 114. The term TCP/IP is commonly used to refer to the Internet architecture.

Data transmission over the network 100 therefore consists of generating data in, e.g., sending process 104 executing on the source station 110, passing that data to the application layer 112 and down through the layers of the protocol stack 125, where the data are sequentially formatted as a frame for delivery onto the network communications medium 180 as bits. Those frame bits are then transmitted over an established connection of medium 180 to the protocol stack 175 of the destination station 150 where they are passed up the layers 166, 160, 164, 162, 156, 154, and 152 of that stack 175 to a receiving process 174. Data flow is schematically illustrated by solid arrows.

Although actual data transmission occurs vertically through the stacks, each layer is programmed as though such transmission were horizontal. That is, each layer in the source station 110 is programmed to transmit data to its corresponding layer in the destination station 150, as schematically shown by dotted arrows. To achieve this effect, each layer of the protocol stack 125 in the source station 110 typically adds information (in the form of a header) to the data generated by the sending process as the data descends the stack.

For example, the network layer encapsulates data presented to it by the transport layer within a packet having a network layer header. The network layer header contains, among other information, source and destination (logical) network addresses needed to complete the data transfer. The data link layer, in turn, encapsulates the packet in a frame that includes a data link layer header containing information required to complete the data link functions, such as (physical) MAC addresses. At the destination station 150, these encapsulated headers are stripped off one-by-one as the frame propagates up the layers of the stack 175 until it arrives at the receiving process.

A "client/server network" is one conventional type of computer network architecture wherein data files stored or residing in one or more computer nodes (commonly termed "server" computer nodes or "servers") in the network are shared, using a distributed computer file system, by multiple processes (commonly termed "client processes") executing/residing in other computer nodes (commonly termed "client" computer nodes) in the network. That is, data files and their characteristics stored or residing in the one or more server computer nodes may be accessed and modified via the distributed file system, by multiple client processes executing/residing in the client computer nodes.

The client/server network architecture offers advantages over other types of network architectures. For example, since in a client/server network, data files residing in a server computer node may be accessed by client processes residing in the client computer nodes, copies of these files need not also reside in the client nodes. This increases the amount of client computers' resources that may be made available for other purposes, and eliminates the cost and time necessary to support and maintain separate copies of these files in the client computers.

A distributed computerized database system may be implemented using a client/server network architecture. In such a distributed database system, database management functions may be implemented by management processes executing on geographically distributed nodes; likewise, the database records may be distributed among the distributed nodes. For example, a distributed database may comprise multiple server nodes, and database management processes and records may be executed by and stored in, respectively, the server nodes. Respective client nodes may be associated with respective server nodes, and the respective client nodes may access the database records via interaction with the respective server nodes with which they are associated.

In conventional distributed database systems, complex mechanisms typically are used to determine the location of a database record requested by a client process. Disadvantageously, such complex mechanisms typically are implemented by complex software program code that is difficult to document, modify, and use with other database management-related programs.

Additionally, in conventional distributed databases, a further problem can arise when a particular data record (e.g., a master data record) is relocated from one server node to another server node (i.e., the master record stored in one server is no longer to be considered authoritative, and instead, another data record stored in a different server is to be considered authoritative). That is, the database must include a mechanism that ensures that the relocation of the master data record is made known to the processes (e.g., client node processes) that may desire to access the master data record (e.g., for purposes of replicating the record or data synchronization).

SUMMARY OF THE INVENTION

In accordance with the present invention, a computerized database system and method are provided that are able to overcome the aforesaid and other disadvantages and drawbacks of the prior art. More specifically, in one aspect of the present invention, a relatively simple mechanism is provided by which data records in the database may be identified and accessed. The mechanism uses specialized data structures, termed "unique identification keys," that are associated with the data records. Each respective key specifies a respective location where a respective data record resides in a database. Each respective key specifies the respective location using a logical location value and a server identification value (e.g., the key may contain these values). The logical location value indicates a respective logical location where the respective data record, associated with the respective key, resides in the database. The server identification value indicates a respective physical server, assigned to the logical location, in which the respective record is stored. Each respective key may also specify a client identification number that identifies a client computer node, process, and/or user that was responsible for the creation of the respective data record, the time of creation of the respective data record, a key generation sequence number, and/or a key checksum value for use in determining whether errors exist in the respective key.

The server identification value may comprise a physical (e.g., MAC) address of a physical server in which the respective record resides. Also, in one embodiment of this aspect of the present invention, the database may include a plurality of geographically-distributed servers that are logically organized into server groups according to, inter alia respective functions performed by the respective server groups. In order to provide fault-tolerance, each of these server groups may include an active server and at least one backup server.

In another aspect of the present invention, a mechanism is provided that efficiently informs processes (e.g., client node processes) seeking to access or modify a database master record of relocating of that master data record. In one embodiment of this aspect of the present invention, a first version of a master record is stored in a first server node, and a second version of the master record is stored in a second server node, respectively. Each of the versions of the master record is associated with a respective unique identification key. The first server, in response to a master record relocation command modifies the first version of the master data record to include a reference to the respective identification key of the second version of the data record and changes the read/write status or attribute of the first record to read-only. In response to the master record transfer command, the second server node modifies the second version of the master record to include a reference to the respective key of the first version of the master record. The respective identification keys associated with the first and second versions of the master record each may be of the type used in the first aspect of the present invention.

Advantageously, the relatively simple data record identification and accessing mechanism, provided in the first aspect of the present invention, may be implemented by software program code that is more easily documented, modified, and used with other database management-related programs than the relatively complex data record identification and accessing mechanisms of the prior art. Also advantageously, in the second aspect of the present invention, a relatively simple and efficient mechanism is provided that ensures that a relocation of a master record in the database is made known to processes (e.g., client node processes) that may desire to access or modify the master record.

These and other features and advantages of the present invention will become apparent as the following Detailed Description proceeds and upon reference to the Drawings wherein like numerals depict like parts, and wherein:

Although the following Detailed Description will proceed with reference being made to illustrative embodiments and methods of use, it should be understood that the present invention is not limited to these illustrative embodiments and methods of use. On the contrary, as will be appreciated by those skilled in the art, many modifications, alternatives, and variations thereof will be apparent to those skilled in the art. Accordingly, the present invention is to be viewed broadly, as encompassing all such modifications, alternatives, and variations, and as being defined only as set forth in the hereinafter appended claims.

DETAILED DESCRIPTION OF ILLUSTRATIVE EMBODIMENTS

Figure 1:
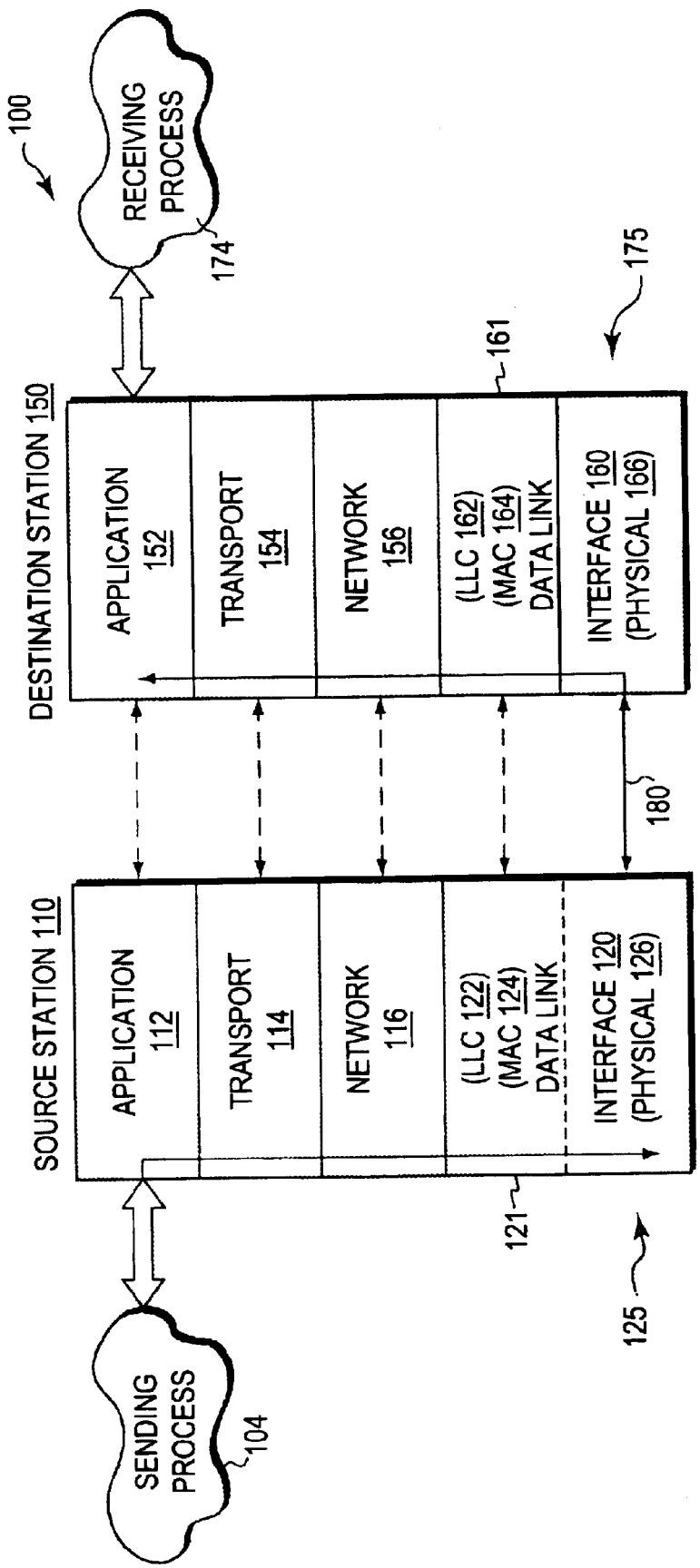
FIG. 1 is a schematic block diagram of a prior art communications system.
Figure 2:
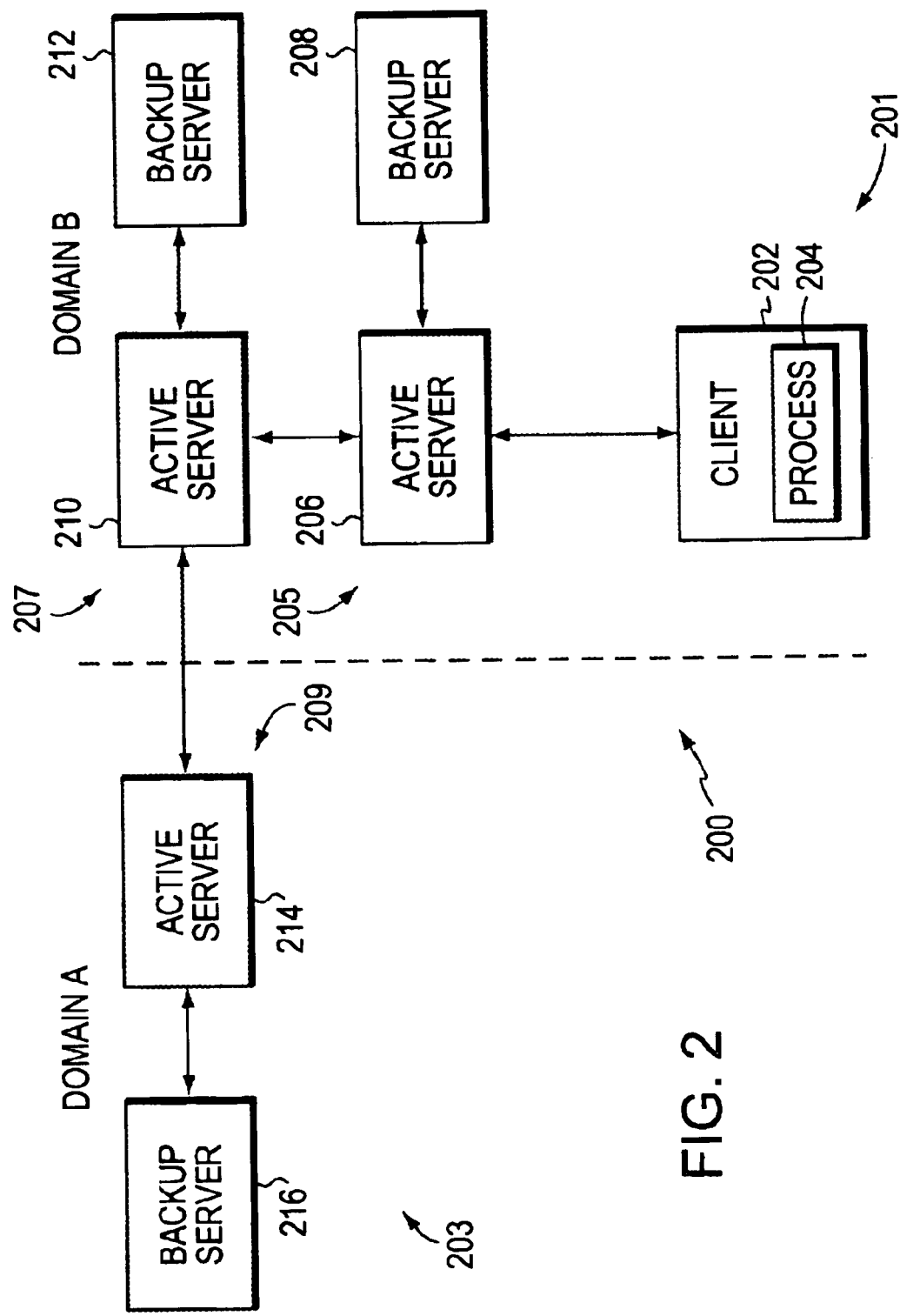
FIG. 2 is a schematic block diagram of one embodiment of a distributed database system according to the present invention.

With reference now being made to FIGS. 2–5, illustrative embodiments of the aspects of the present invention will be described. FIG. 2 is a schematic block diagram illustrating one embodiment of a distributed database system 200 wherein the aspects of the present invention may be advantageously practiced. System 200 comprises a client/server network system that includes one or more client computer nodes (collectively or singly referred to by numeral 202) and a plurality of geographically-distributed server computer nodes 206, 208, 210, 212, 214, and 216. The server nodes 206, 208, 210, 212, 214, and 216 are grouped into respective server groups 205, 207, and 209. Each server group 205, 207, and 209 includes at least two server nodes: an active server node and a backup server node. More specifically, in system 200, server group 205 includes active server 206 and backup server 208, server group 207 includes active server 210 and backup server 212, and server group 209 includes active server 214 and backup server 216, respectively.

Each respective server group 205, 207, 209 provides one or more respective functions or services of system 200. That is, for example, the server groups may store respective different types of data records depending upon the users of the nodes 202 associated with the servers in the server groups. Backup server nodes 208, 212, and 216 are provided in system 200 to add fault-tolerance to the system 200. That is, the backup server nodes 208, 212, and 216 exist in system 200 to provide redundant storage of database records stored in the respective active server nodes 206, 210, and 214 in the respective server groups 205, 207, 209. Additionally, backup servers 208, 212, 216 are also provided in system 200 to assume (i.e., perform) the functions of servers 206, 210, 214, in the event of failure of servers 206, 210, 214, respectively. Conventional fault-tolerance mechanisms are used in system 200 to ensure that backup servers 208, 212, 216 maintain data storage synchronization with the active servers 206, 210, 214, respectively, with which they are associated, and that in the event of failure of such active servers, the respective backup servers with which they are associated seamlessly receive and process data messages and commands that otherwise would be received and processed by the failed active server.

As stated previously, system 200 includes one or more client nodes 202. It should be understood that, although not shown in FIG. 2 for purposes of clarity of illustration, system 200 may include a plurality of client nodes, and one or more respective client nodes may be able to operatively interact and communicate with each of the respective active servers 206, 210, and 214.

Each of the client and server nodes 202, 206, 208, 210, 212, 214, and 216 is located in and constitutes its own respective physical location. Additionally, in system 200, each of these nodes 202, 206, 208, 210, 212, 214, and 216 is associated with one of two logical locations (i.e., domain A or domain B) 203 or 201, respectively. More specifically, in system 200, each of the nodes 202, 206, 208, 210, 212, 214, and 216 is associated with either a first logical location (i.e., domain A) 203 or a second logical location (i.e., domain B) 201. These domains 201, 203 are associated with, and are used to distinguish logical entities or units with which the nodes are associated, or to which the nodes belong. For example, the domains 201, 203 may include different corporate entities, different groups within corporations (e.g., engineering and marketing groups), etc.

In system 200, each of the computer nodes 202, 206, 208, 210, 212, 214, and 216 includes computer-readable memory for storing software programs, algorithms, and data structures associated with, and for carrying out, the inventive database techniques, and related and other techniques and methods described herein as being carried out by or implemented in system 200. In addition, each of the nodes further includes a processor (e.g., an Intel 80x86 processor) for executing these software programs and algorithms, and for manipulating the stored data structures, to enable the nodes to carry out these methods and techniques in network 200. Each of the nodes 202, 206, 208, 210, 212, 214, and 216 may also include a conventional user input/output interface (e.g., comprising keyboard, pointing device, display terminal, etc.) for permitting a human user to control and interact with the node. Additionally, although not specifically shown in FIG. 2, it should be understood that the nodes 202, 206, 208, 210, 212, 214, and 216 are interconnected by a network communications medium (e.g., similar to medium 180).

Figure 3:
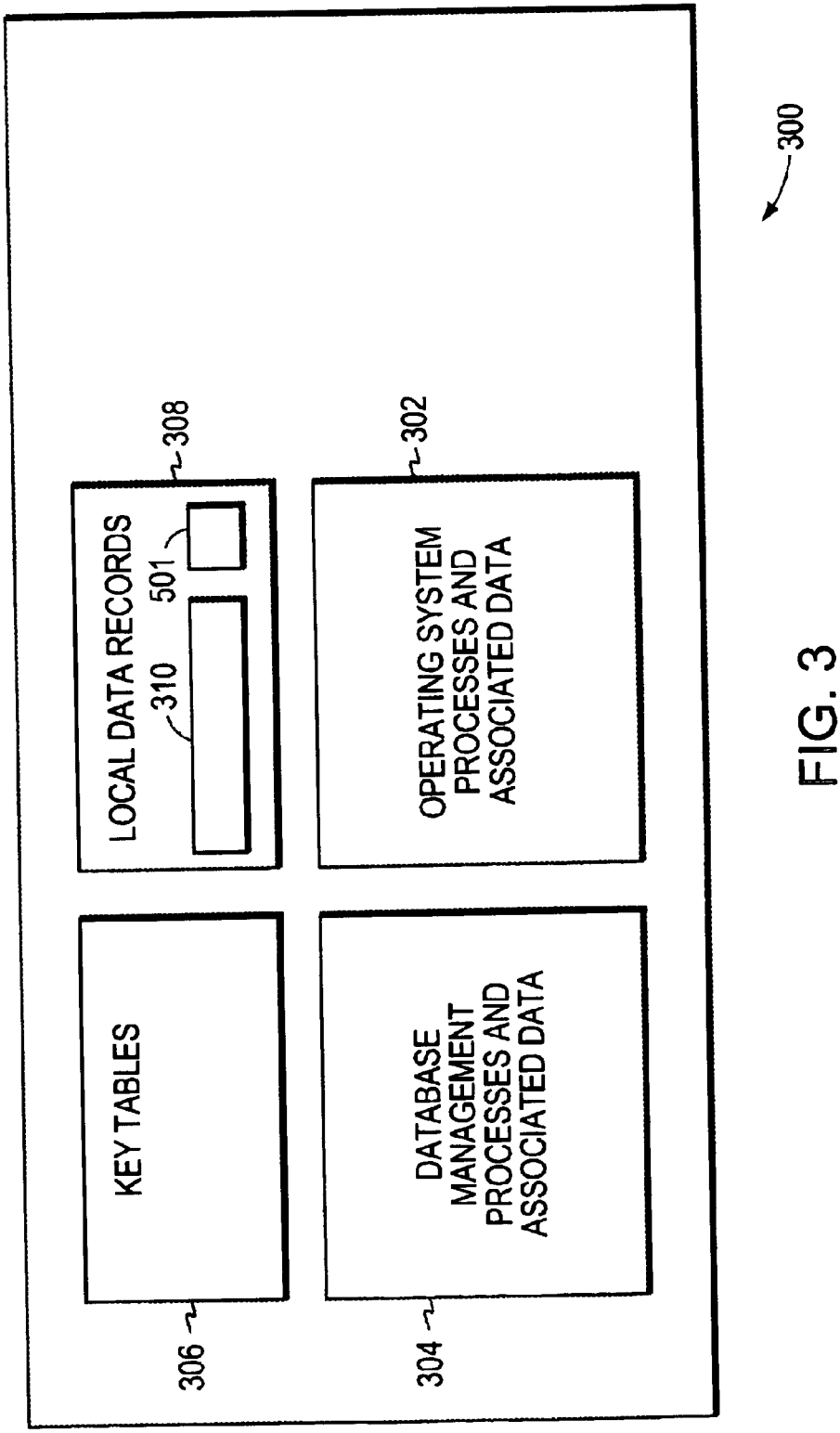
FIG. 3 is a schematic block diagram illustrating processes and related program instructions and data structures that reside in a computer-readable memory in a server node in the database system of FIG. 2.

FIG. 3 is a schematic block diagram illustrating computer program processes and data structures that reside in the respective computer-readable memories of the server nodes 206, 208, 210, 212, 214, and 216. More specifically, each respective server node, 206, 208, 210, 212, 214, and 216 includes a respective memory 300 within which resides operating system processes and associated data 302, distributed database management processes and associated data 304, tables 306 that contain certain data (that will be described more fully below) that are utilized by the processes 304, and locally-stored data records 308 of the distributed database stored in system 200. In operation, the database management processes and associated data 304 may be spawned by (or, alternatively, comprised in) one or more of the executing operating system processes 302. The processes 304 generate and maintain tables 306 and data records 308.

In system 200, the aggregate of the local data records 308 stored in the respective memories 300 of the server nodes 206, 208, 210, 212, 214 and 216 comprises the total data records in the distributed database system 200. As will be described more fully below, the database records in database 200 may be accessed and modified by the servers in response to database function calls (e.g., component object model-based interface method calls) issued from the one or more client processes 204 to the servers.

More specifically, database client processes 204 reside and execute in the memory of the client nodes 202. Processes 204 may access or modify the data records stored in the database system 200 by issuing appropriate database function calls to the processes 304 residing in the servers.

For example, in system 200, when a client node process 204 of a client node 202 issues such a function call to an active server (e.g., server 206) with which the node 202 is associated, the function call is received by the processes 304 residing in the memory 300 of that server 206. These processes 304 then process the function call. Examples of such function calls include calls that request deletion, relocation, querying, accessing, and initial creation of data records.

Figure 4:
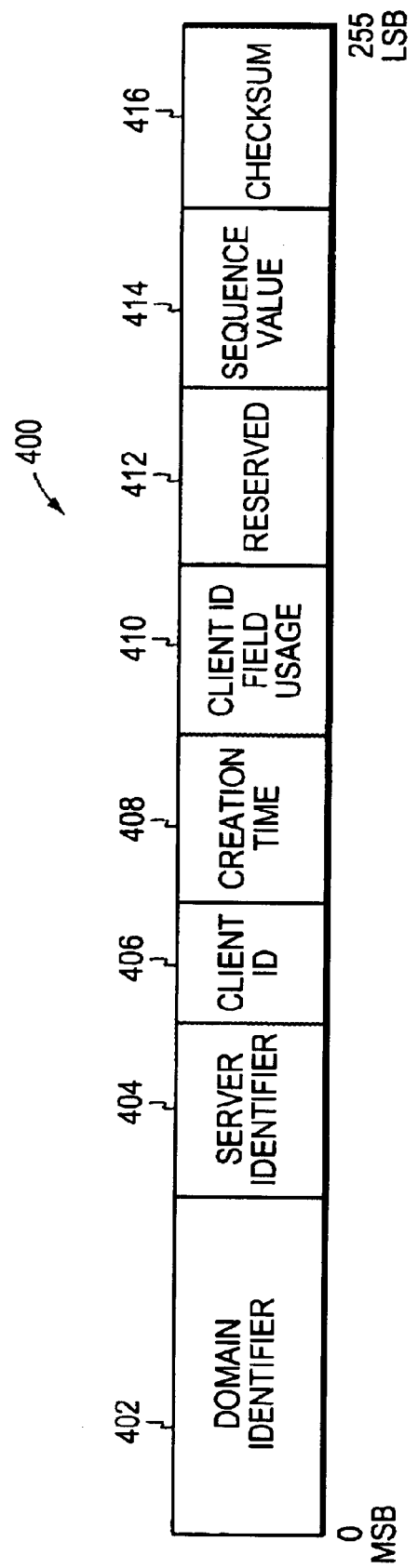
FIG. 4 is a diagram illustrating the data structure of one embodiment of a data record identification key used in the system of FIG. 2.
Figure 5:
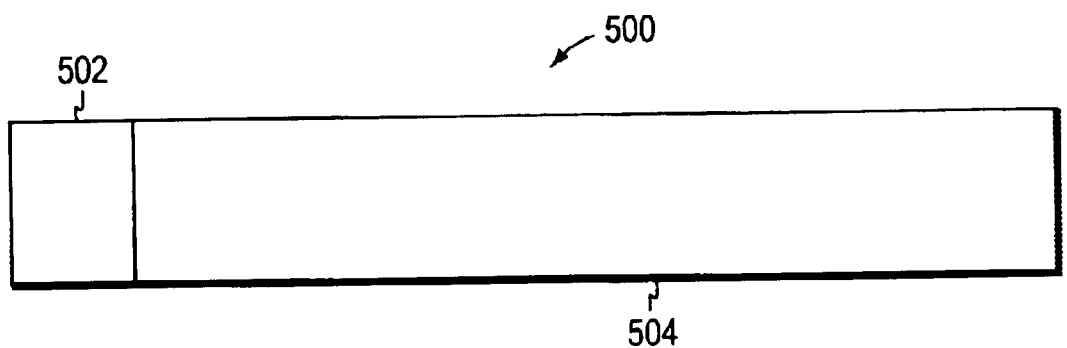
FIG. 5 is a schematic diagram illustrating the structure of a master record stored in a computer-readable memory in a server node in the system of FIG. 2.

When processes 304 in server node 206 receive a function call from a client process 204 requesting the initial creation of a data record, the processes 304 in server 206 generate in memory 300 of server 206 a data record (e.g., record 310) in accordance with particular attributes requested for the data record 310 in the function call (e.g., security attributes, data record expiration attributes, etc.). Such an initially-created data record is considered to be a master record, unless and until the record is relocated in accordance with the record relocation process that will be described below. After creating the record 310, or concurrently with the initial creation of the data record 310, the processes 304 in server 206 generate and return to the process 204 that issued the function call a respective unique identification key (the data structure and information contents 400 of which are illustrated in FIG. 4). The processes 304 in server 206 store the key in tables 306 of server 206, in association with the path to the data record in the server 206.

As shown in FIG. 4, the data structure 400 of each data record identification key generated in system 200 includes data fields 402, 404, 406, 408, 410, 412, 414, and 416. The structure 400 has a total size of 256 bits. The first data field 402 of each respective key 400 contains a 96 bit value that identifies the logical location of the active server (e.g., server 206) that initially generated the respective data record associated with the respective identification key. The value 402 may comprise, or be generated based upon both the physical (e.g., MAC) address of a particular active server (e.g., server 210) in the logical location 201 of the respective active server 206 creating the respective key, and the date and time that the domain 201 was instantiated or initialized. The second data field 404 in structure 400 includes a 48 bit value that specifies the respective physical server (e.g., server 206 in the case of data record 310) that created the respective key. The value 404 may be the MAC address of the server 206 that created the respective key. Field 406 contains a 32 bit value that identifies the client process (e.g., client process 204 in the case of data record 310), client node (e.g., client node 202 in the case of data record 310), human operator, or the client network connection between the client node and the server node from or through which the function call requesting the initial creation of the data field 310 was made. Field 408 contains a 48 bit value that identifies when the respective key was created. Field 410 contains a 2 bit value that identifies which of the aforesaid four types of information that may be identified by in 406 is actually being so identified in field 406 in the respective key. Field 412 is reserved, and comprises 6 bits set to zero. Field 414 contains a 16 bit value that specifies a sequence number assigned to the respective key (e.g., a value that indicates the sequence order of creation of the respective key). Field 416 contains an 8 bit checksum value for use in detecting errors in the respective key.

The manner in which a client process (e.g., process 204) accesses or modifies a previously created data record will now be described. In order to access or modify a previously-created data record in system 200, process 204 issues an appropriate function call for same to an active server 206 associated with the client node 202 within which the process 204 resides. This function call references the unique identification key associated with the data record which process 204 wishes to access or modify. When active server 206 receives this function call, the processes 304 resident in server 206 process the function call. More specifically, processes 304 in server 206 determine from the information stored in the tables 306 in server 206 whether the master record, or a copy thereof, that is associated with the identification key referenced in the function call is stored locally in the server 206, and if such is the case, processes 304 in server 206 either return to process 204 a message containing a copy of the requested portion of the record, if the function call requested accessing of the record, or processes 304 modify the master record or copy thereof in accordance with the function call and return a message to the process 204 that such modification has been made.

Conversely, if processes 304 in server 206 determine from the tables 306 in server 206 that neither the master record, nor a copy thereof, that is associated with the identification key referenced in the function call is stored in the server 206, the processes 304 parse the identification key to determine the logical and physical location values contained in fields 402 and 404 of the identification key. Each of the respective tables 306 in the respective servers 206, 208, 210, 212, 214, and 216 contains respective network routing and/or forwarding tables that correlate respective logical and physical location values that may exist in fields 402 and 404 of valid identification keys with respective actual network and physical (i.e., MAC) addresses of the respective servers, and respective links in the network 200 by which messages to the respective servers may be sent. The processes 304 in server 206 then utilize the information contained in the routing and/or forwarding tables in tables 306 in server 206 and the logical and physical location values obtained from fields 402 and 404 of the identification key referenced in the function call, to determine the actual network and physical addresses of the server (e.g., server 214) in which the master record associated with the identification key is stored, and appropriate network link(s) over which a message from server 206 may be transmitted to the server 214 that stores that master record. The processes 304 in server 206 then generate and over the link(s) a message requesting that the server 214 that stores this master record forward a copy thereof to the server 206. In response to receipt of this message from server 206, the processes 304 in server 214 generate and forward to server 206 a copy of this master record.

When server 206 receives the copy of the master record from server 214, the processes 304 in server 206 store the copy of the master record in memory 300 in server 206. Processes 304 then update the tables 306 in server 206 to indicate that a copy of the master record associated with the key in the function call is now stored locally in server 206. If the function call requested accessing of the record, then processes 304 in server 206 forward to the process 204 a message containing the requested data from the copy of the master record. Alternatively, if the function call requested modification of the record, then processes 304 in server 206 make the requested modification to the copy of the master record and forward a message to the process 204 indicating that such modification has been made.

After making such modifications to the copy of the master record, processes 304 in server 206 transmit to server 214 appropriate messages that cause the processes 304 in server 214 to make corresponding modification to the master record stored in server 214. A subscription-based database record update scheme is used to propagate changes made to master records to copies of the master record. For example, in accordance with this update scheme process 204 may request (i.e., by making an appropriate function call to server 206) that the processes 304 in server 206 receive updated copies of a master record specified in the function call by reference to the identification key associated with the master record, when modification are made to the master record. Processes 304 in server 206, in response to such a function call, may forward an appropriate message to the server (e.g., server 214) containing the master record; in response to such message, the processes 304 in server 214 may forward to server 206 updated copies of the master record when modifications are made to the master record (e.g., as a result of changes made to a copy thereof stored in server 210). Processes 304 in server 206 may overwrite its locally stored copy of the master record with the updated copies thereof forwarded from server 214. In this way, data coherency among master records and copies thereof may be maintained in the distributed database system 200.

As stated previously, the servers in network 200 are grouped or partitioned into respective server groups 205, 207, 209 that perform specific functions in network 200. When the configuration of network 200 is changed such that the grouping or partitioning of the servers in the server groups changes, it may become necessary to relocate a master record stored in one active server to another active server. This is accomplished in system 200 in the following manner.

For purposes of this discussion, it is assumed that a master record (e.g., record 500 shown in FIG. 5) is stored in active server 210, and is to be relocated to active server 206. As it initially exists (i.e., prior to undergoing this relocation process), master record 500 includes only data 504, since, as will be described more fully below, data 502 is added to master record 500 as a result of the relocation process. Prior to commencement of the relocation process, another version of the master record 500 (e.g., master record 501) is created in active server 206. The data 504 present in record 500 is then copied into record 501. When a data record is initially created, a respective identification key is also generated that is associated with that data record. Thus, when master record 501 is created in server 206, an identification key is also created that is associated with master record 501.

The data record relocation process is then initiated by transmission to server 210 of a record relocation command message (e.g., generated and supplied from a not shown client node process associated with the active server 210). In response to this message, the processes 304 in server 210 modify the record 500 to include data 502. Data 502 comprises a reference to the identification key associated with the record 501. Also in response to the message, the processes 304 in server 210 change the attributes of the record 500 such that the read/write status of the record 500 is changed to a read only status. Processes 304 in server 210 then generate and transmit to server 206 another command message that causes the processes 304 in server 206 to modify record 501 to include data (not shown in FIG. 3) that refers to or comprises the identification key associated with the master record 500. The data 502 is such that, by analyzing the data 502 in the master record 500, a client node process accessing record 500 is able to determine that the record 500 has been relocated to server 206. Also, a client node process seeking to modify the record 500 will be unable to do so. The client process will also be able to determine by analyzing record 501 that an earlier version of the record 501 exists on the server 210 and may be accessed, if necessary (e.g., for research or archival-related reasons).

Thus, it is evident that there has been provided in accordance with the present invention a computerized database system and method that fully satisfy the aforesaid and other advantages. The foregoing description has been directed to specific embodiments of the present invention. It will be apparent, however, that other alternatives, variations and modifications may be made to the described embodiments, with the attainment of some or all of their advantages. Therefore, it is intended that the present invention be viewed as being of broad scope and as covering all such alternatives, modifications, and variations. Thus, it is intended that the present invention be viewed only as set forth in the hereinafter appended claims.

What is claimed is:

1. A computerized distributed database, comprising:
  a plurality of geographically distributed servers that store data records, each of said records being identified by and accessible via a respective unique identification key, each respective key specifying at least one respective location where a respective record resides in the database, the respective location being specified by a logical location value that indicates a respective logical location where the respective record resides in the database and a server identification value that indicates a respective physical server assigned to the logical location in which the respective record is stored.

2. A database according to claim 1, wherein the server identification value is a physical address.

3. A database according to claim 1, wherein the logical location value indicates a logical domain.

4. A computerized distributed database, comprising:
  a first server and a second server, the first server storing a first version of a data record, the second server storing a second version of the data record, each of said first and second versions of the data record being associated with a respective unique identification key;
  each respective identification key specifying at least one respective location where a respective record resides in the database, the respective location being specified by a logical location value that indicates a respective logical location where the respective record resides in the database and a server identification value that indicates a respective physical server assigned to the logical location in which the respective record is stored; and
  the first server, in response to a record relocation command, modifying the first version of the data record to include a reference to the respective key of the second version of the data record and changing a read/write status of the first record to a read only status, the second version of the data record including a reference to the respective key of the first version of the data record.

5. A database according to claim 4, wherein the respective key associated with the first version of the data record specifies a respective logical location value that indicates a respective logical location where the first version of the data record resides and a server identification value that indicates the first server, and also wherein the respective key associated with the second version of the data record specifies a respective logical location value that indicates a respective logical location where the second version of the data record resides and a server identification value that indicates the second server.

6. A method implemented in a computerized distributed database system including a plurality of geographically distributed servers, comprising:

storing data records in the servers, each of said records being identified by and accessible via a respective unique identification key, each respective key specifying at least one respective location where a respective record resides in the database, the respective location being specified by a logical location value that indicates a respective logical location where the respective record resides in the database and a server identification value that indicates a respective physical server assigned to the logical location in which the respective record is stored.

7. A method according to claim 6, wherein the server identification value is a physical address.

8. A method according to claim 6, wherein the logical location value specifies a logical domain.

9. A method implemented in computerized distributed database system including a first and a second server, comprising:

storing in the first server a first version of a data record, storing in the second server a second version of the data record, each of said first and second versions of the data record being associated with a respective unique identification key;

specifying, by each respective identification key, at least one respective location where a respective record resides in the database, the respective location being specified by a logical location value that indicates a respective logical location where the respective record resides in the database and a server identification value that indicates a respective physical server assigned to the logical location in which the respective record is stored; and modifying by the first server, in response to a record relocation command, the first version of the data record to include a reference to the respective key of the second version of the data record and changing a read/write status of the first record to a read only status, the second version of the data record including a reference to the respective key of the first version of the data record.

10. A method according to claim 9, wherein the respective key associated with the first version of the data record specifies a respective logical location value that indicates a respective logical location where the first version of the data record resides and a server identification value that indicates the first server, and also wherein the respective key associated with the second version of the data record specifies a respective logical location value that indicates a respective logical location where the second version of the data record resides and a server identification value that indicates the second server.

11. Computer-readable memory comprising computer-executable program instructions that when executed cause:

a plurality of geographically distributed servers to store data records and to associate each of said records with a respective unique identification key via which the records are identified and may be accessed, each respective key specifying at least one respective location where a respective record resides in a database, the respective location being specified by a logical location value that indicates a respective logical location where the respective record resides in the database and a server identification value that indicates a respective physical server assigned to the logical location in which the respective record is stored.

12. Computer-readable memory according to claim 11, wherein the server identification value is a physical address.

13. Computer-readable memory according to claim 11, wherein the logical location value specifies a logical domain.

14. Computer-readable memory comprising computer-program instructions that when executed cause:

a first server to store a first version of a data record, a second server to store a second version of the data record, each of said first and second versions of the data record being associated with a respective unique identification key;

each respective identification key specifying at least one respective location where a respective record resides in the database, the respective location being specified by a logical location value that indicates a respective logical location where the respective record resides in the database and a server identification value that indicates a respective physical server assigned to the logical location in which the respective record is stored; and the first server, in response to a record relocation command, to modify the first version of the data record to include a reference to the respective key of the second version of the data record and to change a read/write status of the first record to a read only status, and the second version of the data record to include a reference to the respective key of the first version of the data record.

15. Computer-readable memory according to claim 14, wherein the respective key associated with the first version of the data record specifies a respective logical location valve that indicates a respective logical location where the first version of the data record resides and a server identification value that indicates the first server, and also wherein the respective key associated with the second version of the data record specifies a respective logical location value that indicates a respective logical location where the second version of the data record resides and a server identification value that indicates the second server.

16. A computerized distributed database storing data records, comprising:

a database management mechanism that identifies and permits access to each of said records using a respective unique identification key, each respective key specifying at least one respective location where a respective record resides in the database, the respective location being specified by a logical location value that indicates a respective logical location where the respective record resides in the database and a server identification value that indicates a respective physical server assigned to the logical location in which the respective record is stored.

17. A database according to claim 16, wherein the server identification value is a physical address.

18. A database according to claim 16, wherein the logical location value indicates a logical domain.

19. A computerized distributed database storing data records, comprising:
  a server storing a first version of a data record associated with a respective unique identification key;
  each respective identification key specifying at least one respective location where a respective record resides in the database, the respective location being specified by a logical location value that indicates a respective logical location where the respective record resides in the database and a server identification value that indicates a respective physical server assigned to the logical location in which the respective record is stored; and
  the server, in response to a record relocation command, modifying the first version of the data record to include a reference to the respective key of a second version of the data record and changing a read/write status of the first record to a read only status, the second version of the data record including a reference to the respective key of the first version of the data record.

20. A database according to claim 19, wherein the respective key associated with the first version of the data record specifies a respective logical location value that indicates a respective logical location where the first version of the data record resides and a server identification value that indicates the server.

21. A method implemented in computerized distributed database system, comprising:
  storing in a server a first version of a data record associated with a respective unique identification key;
  specifying, by each respective identification key, at least one respective location where a respective record resides in the database, the respective location being specified by a logical location value that indicates a respective logical location where the respective record resides in the database and a server identification value that indicates a respective physical server assigned to the logical location in which the respective record is stored; and
  modifying by the server, in response to a record relocation command, the first version of the data record to include a reference to the respective key of a second version of the data record and changing a read/write status of the first record to a read only status, the second version of the data record including a reference to the respective key of the first version of the data record.

22. A method according to claim 21, wherein the respective key associated with the first version of the data record specifies a respective logical location value that indicates a respective logical location where the first version of the data record resides and a server identification value that indicates the server.

23. Computer-readable memory comprising computer-program instructions that when executed cause:
  a server to store a first version of a data record in association with a respective unique identification key;
  each respective identification key specifying at least one respective location where a respective record resides in the database, the respective location being specified by a logical location value that indicates a respective logical location where the respective record resides in the database and a server identification value that indicates a respective physical server assigned to the logical location in which the respective record is stored; and
  the server, in response to a record relocation command, to modify the first version of the data record to include a reference to the respective key of a second version of the data record and to change a read/write status of the first record to a read only status, and the second version of the data record to include a reference to the respective key of the first version of the data record.

24. Computer-readable memory according to claim 23, wherein the respective key associated with the first version of the data record specifies a respective logical location valve that indicates a respective logical location where the first version of the data record resides and a server identification value that indicates the server.

25. A computerized distributed database, comprising:
  means for storing a first version of a data record and for storing a second version of the data record;
  means for associating each of said first and second versions of the data record with a respective unique identification key;
  means for specifying, by each respective identification key, at least one respective location where a respective record resides in the database, the respective location being specified by a logical location value that indicates a respective logical location where the respective record resides in the database and a server identification value that indicates a respective physical server assigned to the logical location in which the respective record is stored; and
  means for, in response to a record relocation command, modifying the first version of the data record to include a reference to the respective key of the second version of the data record and for changing a read/write status of the first record to a read only status, the second version of the data record including a reference to the respective key of the first version of the data record.

26. A database according to claim 25, wherein the respective key associated with the first version of the data record specifies a respective logical location value that indicates a respective logical location where the first version of the data record resides and a respective server identification value.

27. A method for operating a server, comprising:
  storing in the server a first version of a data record associated with a respective unique identification key, the record stored as part of a database;
  specifying, by each respective identification key, at least one respective location where a respective record resides in the database, the respective location being specified by a logical location value that indicates a respective logical location where the respective record resides in the database and a server identification value that indicates a respective physical server assigned to the logical location in which the respective record is stored; and
  modifying by the server, in response to a record relocation command, the first version of the data record to include a reference to a second key of a second version of the data record and changing a read/write status of the first record to a read only status, the second version of the data record including a reference to the respective key of the first version of the data record.

28. The method of claim 27, further comprising:
  indicating the first server by a physical address of the first server.

29. The method of claim 27, further comprising:
  indicating the first logical location a logical domain in the first server.

30. The method as in claim 27, further comprising:
  specifying, by the second key of a second version of the data record, a second server where the second version of the data record resides; and indicating by a second logical location value a logical location where the second version of the data record resides in the second server.

31. The method of claim 27, further comprising:

indicating the second server by a physical address of the second server.

32. The method of claim 27, further comprising:

indicating by the second logical location a logical domain in the second server.

33. The method of claim 27, further comprising:

setting the second version of the data record to a read/write status.

34. A server, comprising:

means for storing in the server a first version of a data record associated with a respective unique identification key, the record stored as part of a database;

means for specifying, by each respective identification key, at least one respective location where a respective record resides in the database, the respective location being specified by a logical location value that indicates a respective logical location where the respective record resides in the database and a server identification value that indicates a respective physical server assigned to the logical location in which the respective record is stored; and means for modifying by the server, in response to a record relocation command, the first version of the data record to include a reference to a second key of a second version of the data record and changing a read/write status of the first record to a read only status, the second version of the data record including a reference to the respective key of the first version of the data record.

35. The server of claim 34, further comprising:

means for indicating the first server by a physical address of the first server.

36. The server of claim 34, further comprising:

means for indicating the first logical location a logical domain in the first server.

37. The server of claim 34, further comprising:

means for specifying, by the second key of a second version of the data record, a second server where the second version of the data record resides; and means for indicating by a second logical location value a logical location where the second version of the data record resides in the second server.

38. The server of claim 34, further comprising:

means for indicating the second server by a physical address of the second server.

39. The server of claim 34, further comprising:

means for indicating the second logical location a logical domain in the second server.

40. The server of claim 34, further comprising:

means for setting the second version of the data record to a read/write status.

41. A server, comprising:

a first version of a data record associated with a respective unique identification key, the record stored in the server as part of a database;

each respective identification key specifying at least one respective location where a respective record resides in the database, the respective location being specified by a logical location value that indicates a respective logical location where the respective record resides in the database and a server identification value that indicates a respective physical server assigned to the logical location in which the respective record is stored; and a processor to modify, in response to a record relocation command, the first version of the data record to include a reference to a second key of a second version of the data record and changing a read/write status of the first record to a read only status, the second version of the data record including a reference to the respective key of the first version of the data record.

42. The server of claim 41, further comprising:

a physical address to indicate the first server.

43. The server of claim 42, further comprising:

a logical domain in the first server to indicate the first logical location.

44. The server of claim 42, further comprising:

the second key of a second version of the data record specifying a second server where the second version of the data record resides; and a second logical location value indicating a logical location where the second version of the data record resides in the second server.

45. The server of claim 42, further comprising:

a physical address to indicate the second server.

46. The server of claim 42, further comprising:

the second logical location indicated by a logical domain in the second server.

47. The server of claim 41, further comprising:

means for setting the second version of the data record to a read/write status.

48. A computer readable media, comprising:

said computer readable media having instructions written thereon for execution on a processor for the practice of the method of claim 9 or claim 21 or claim 24 or claim 36.

49. Electromagnetic signals propagating on a computer network, comprising:

said electromagnetic signals carrying instructions for execution on a processor for the practice of the method of claim 9 or claim 21 or claim 24 or claim 36.

* * * * *